(12) United States Patent
Takahashi

(10) Patent No.: US 9,060,148 B2
(45) Date of Patent: Jun. 16, 2015

(54) IMAGE READING DEVICE, IMAGE FORMING APPARATUS, AND IMAGE READING METHOD

(71) Applicant: KYOCERA Document Solutions Inc., Osaka-shi, Osaka (JP)

(72) Inventor: Masayoshi Takahashi, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/525,032

(22) Filed: Oct. 27, 2014

(65) Prior Publication Data

US 2015/0116790 A1    Apr. 30, 2015

(30) Foreign Application Priority Data

Oct. 30, 2013   (JP) .................................. 2013-226024

(51) Int. Cl.
  *H04N 1/04*    (2006.01)
  *H04N 1/387*   (2006.01)
  *H04N 1/409*   (2006.01)

(52) U.S. Cl.
  CPC ............. *H04N 1/3871* (2013.01); *H04N 1/409* (2013.01); *H04N 2201/0081* (2013.01); *H04N 2201/0094* (2013.01)

(58) Field of Classification Search
  CPC ....... A61F 2/1624; A61F 2/14; A61F 2/1659; G03B 15/00; G03B 17/24; G03B 27/32; G03B 27/735; G03B 5/00; G03B 15/05; G06K 15/027; G06K 9/00362; G06K 2209/19; G06K 9/209; G06K 9/32

USPC .......... 382/167, 275, 154, 162, 254; 358/1.2, 358/1.9, 474, 497, 518, 401, 443, 471, 483, 358/486, 494, 505, 2.1, 300, 3.02, 444, 445, 358/446, 475, 500, 504, 509, 512, 519, 521, 358/525, 529, 530

See application file for complete search history.

(56) References Cited

U.S. PATENT DOCUMENTS

| | | | | |
|---|---|---|---|---|
| 4,288,821 | A * | 9/1981 | Lavallee et al. .............. | 358/3.07 |
| 5,138,454 | A * | 8/1992 | Parulski ........................ | 348/581 |
| 5,239,392 | A * | 8/1993 | Suzuki et al. ................ | 358/474 |
| 6,934,840 | B2 * | 8/2005 | Rich et al. ..................... | 713/156 |
| 7,336,846 | B2 * | 2/2008 | Misaka et al. ................ | 382/254 |

(Continued)

FOREIGN PATENT DOCUMENTS

JP          11164096 A     6/1999

*Primary Examiner* — Negussie Worku
(74) *Attorney, Agent, or Firm* — Alleman Hall McCoy Russell & Tuttle LLP

(57) ABSTRACT

An image forming apparatus includes low and high resolution imaging portions, a data generating portion, first and second reading portions, and a reading control portion. The first reading portion acquires, from the high resolution imaging portion, as output data for one pixel, data acquired by n-number of light receiving elements adjacent to each other in a main scanning direction in the high resolution imaging portion. The second reading portion acquires output data from light receiving elements arranged in the main scanning direction from a start position displaced by a distance corresponding to m times a second pitch in the main scanning direction from a first reference position in the high resolution imaging portion, where m is an integer. The reading control portion executes a reading operation for a document by the low and high resolution imaging portions, selecting the first reading portion or selecting both of the reading portions.

7 Claims, 9 Drawing Sheets

(56) References Cited

U.S. PATENT DOCUMENTS

| | | | |
|---|---|---|---|
| 7,911,662 B2* | 3/2011 | Inada | 358/482 |
| 7,957,040 B2* | 6/2011 | King et al. | 358/483 |
| 8,259,366 B2* | 9/2012 | Hayakawa et al. | 358/497 |
| 8,368,948 B2* | 2/2013 | Nakano | 358/1.2 |
| 2008/0187243 A1* | 8/2008 | Misaka | 382/294 |
| 2009/0316172 A1* | 12/2009 | Tanimoto | 358/1.9 |

* cited by examiner

IMAGE READING DEVICE, IMAGE FORMING APPARATUS, AND IMAGE READING METHOD

INCORPORATION BY REFERENCE

This application is based upon and claims the benefit of priority from the corresponding Japanese Patent Application No. 2013-226024 filed on Oct. 30, 2013, the entire contents of which are incorporated herein by reference.

BACKGROUND

The present disclosure relates to an image reading device, an image forming apparatus, and an image reading method for reading image data from a document.

In an image reading device such as a scanner, when image data is read from a document with a foreign material or dirt on a light radiation path from a linear sensor chip to the document, streak-like noise may occur on obtained image data. As a measure for preventing such occurrence of streak-like noise, there is known an image reading device in which linear sensor chips are arranged in parallel in two rows along a sub scanning direction. In addition, there is known a method in which image data outputted from linear sensor chips arranged in parallel in two rows are superimposed, thereby obtaining image data with a high S/N ratio (signal/noise ratio). Further, there is known a method in which two rows of linear sensor chips are displaced from each other by half pixel in a main scanning direction, thereby obtaining a resolution that is approximately twofold.

SUMMARY

An image reading device according to one aspect of the present disclosure includes a low resolution imaging portion, a high resolution imaging portion, a data generating portion, a first reading portion, a second reading portion, and a reading control portion. The low resolution imaging portion includes a plurality of light receiving elements arranged with a first pitch in a main scanning direction from a first reference position. The high resolution imaging portion includes a plurality of light receiving elements arranged with a second pitch in the main scanning direction from a second reference position which is separated from the first reference position by a predetermined distance in a sub scanning direction, a resolution of the high resolution imaging portion being n times that of the low resolution imaging portion, where n is an integer. The data generating portion is configured to generate image data of a document that is a reading target, using output data from the high resolution imaging portion and the low resolution imaging portion. The first reading portion is configured to acquire, from the high resolution imaging portion, as the output data for one pixel, data acquired by n-number of the light receiving elements that are adjacent to each other in the main scanning direction in the high resolution imaging portion. The second reading portion is configured to acquire the output data from the light receiving elements arranged in the main scanning direction from a start position which is a position displaced by a distance corresponding to m times the second pitch in the main scanning direction from the first reference position in the high resolution imaging portion, where m is an integer. The reading control portion is configured to execute a reading operation for a document by the low resolution imaging portion and the high resolution imaging portion, selecting the first reading portion or selecting both of the first reading portion and the second reading portion.

An image forming apparatus according to another aspect of the present disclosure includes the image reading device and an image forming portion configured to form an image based on image data read by the image reading device.

An image reading method according to another aspect of the present disclosure includes first to third steps to be executed by an image reading device including a low resolution imaging portion, a high resolution imaging portion, and a data generating portion. The low resolution imaging portion includes a plurality of light receiving elements arranged with a first pitch in a main scanning direction from a first reference position. The high resolution imaging portion includes a plurality of light receiving elements arranged with a second pitch in the main scanning direction from a second reference position which is separated from the first reference position by a predetermined distance in a sub scanning direction, a resolution of the high resolution imaging portion being n times that of the low resolution imaging portion, where n is an integer. The data generating portion is configured to generate image data of a document that is a reading target, using output data from the high resolution imaging portion and the low resolution imaging portion. In the first step, data acquired by n-number of the light receiving elements that are adjacent to each other in the main scanning direction in the high resolution imaging portion is acquired as the output data for one pixel from the high resolution imaging portion. In the second step, the output data is acquired from the light receiving elements arranged in the main scanning direction from a start position which is a position displaced by a distance corresponding to m times the second pitch in the main scanning direction from the first reference position in the high resolution imaging portion, where m is an integer. In the third step, a reading operation for a document by the low resolution imaging portion and the high resolution imaging portion is executed, selecting the first step or selecting both of the first step and the second step.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, with reference to the accompanying drawings, embodiments of the present disclosure will be described for understanding of the present disclosure. It is noted that the following embodiments are merely examples in which the present disclosure is embodied, and do not limit the technical scope of the present disclosure.

[Schematic Configuration of Image Forming Apparatus]

First, with reference to FIG. 1, FIG. 2, FIG. 3A, and FIG. 3B, the schematic configuration of an image forming apparatus 10 according to an embodiment of the present disclosure will be described.

Figure 1:
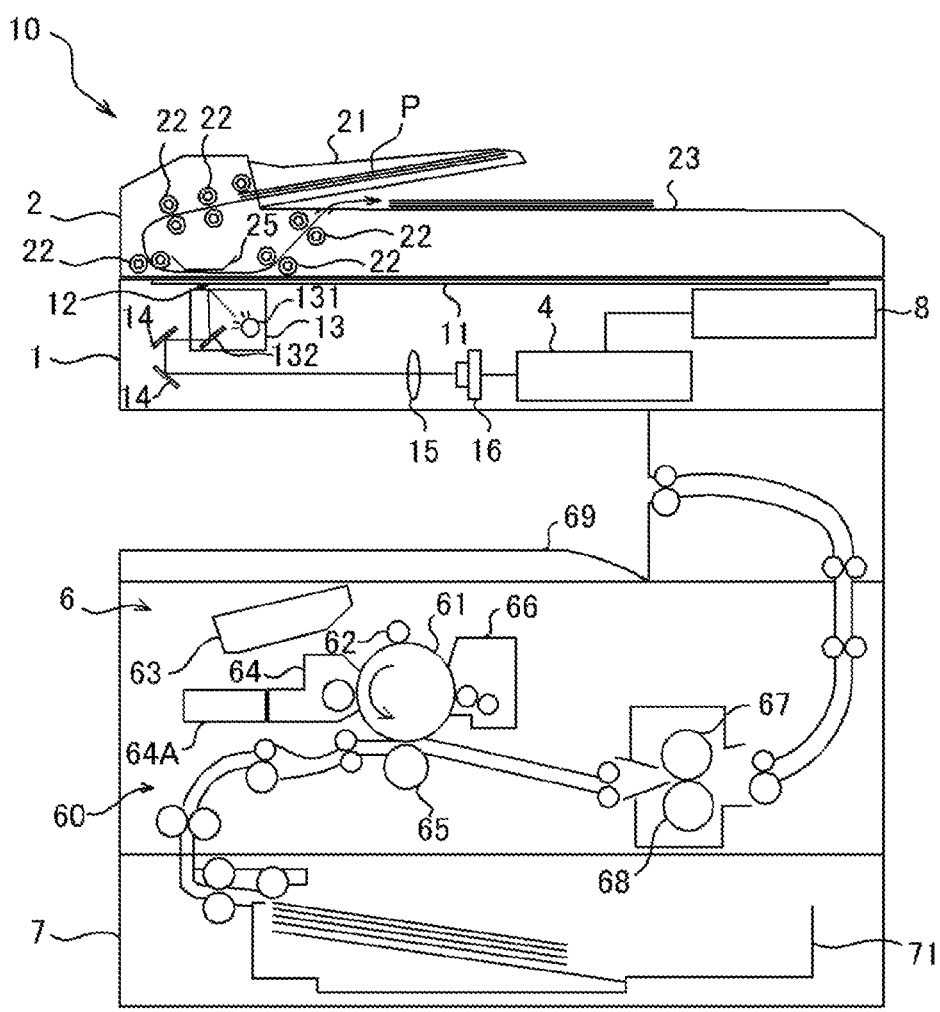
FIG. 1 is a schematic diagram showing a schematic configuration of an image forming apparatus according to an embodiment of the present disclosure.
Figure 2:
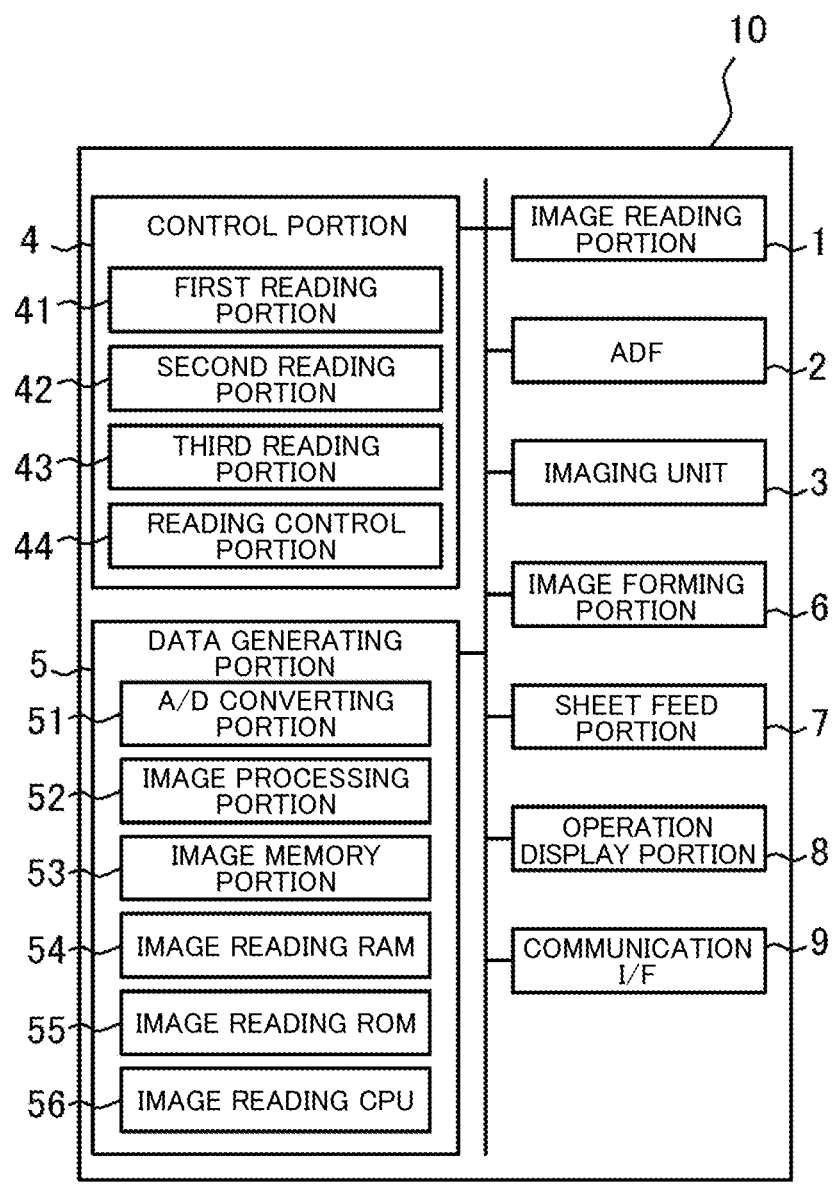
FIG. 2 is a block diagram showing the system configuration of the image forming apparatus according to the embodiment of the present disclosure.

As shown in FIG. 1 and FIG. 2, the image forming apparatus 10 is a multifunction peripheral including an image reading portion 1, an ADF 2, a control portion 4, a data generating portion 5, an image forming portion 6, a sheet feed portion 7, an operation display portion 8, a communication I/F 9, and the like. In the present embodiment, a device including the image reading portion 1, the data generating portion 5, and the control portion 4 is an example of an image reading device according to the present disclosure. It is noted that other examples of the image reading device or the image forming apparatus according to the present disclosure include a copy machine, a scanner, and a facsimile.

The image reading portion 1 includes a contact glass 11, a light source unit 13, a mirror 14, an optical lens 15, an imaging portion 16, and the like.

The contact glass 11 is a transparent document table which is located on an upper surface of the image reading portion 1 and allows a document P to be placed thereon as an image reading target of the image forming apparatus 10.

The light source unit 13 includes an LED light source 131 and a mirror 132, and is movable in the right-left direction (sub scanning direction) in FIG. 1 by a motor (not shown). The LED light source 131 has multiple white LEDs arranged in the depth direction (hereinafter, referred to as "main scanning direction") in FIG. 1, and radiates one line of white light to a reading position 12 on the contact glass 11. The mirror 132 reflects, toward the mirror 14, light reflected from the document P present at the reading position 12 or from a document presser 25 described later. Then, the light reflected from the mirror 132 is guided into the optical lens 15 by the mirror 14. The optical lens 15 converges the entering light into the imaging portion 16. The imaging portion 16 includes a CCD (Charge Coupled Device) which outputs an image signal corresponding to a reception amount of the light entering thereto from the optical lens 15. Then, the imaging portion 16 inputs the image signal as image data corresponding to one line of the document P, to the control portion 4.

On the other hand, the ADF 2 includes a document set portion 21, a plurality of conveyance rollers 22, a sheet discharge portion 23, the document presser 25, and the like. By driving each conveyance roller 22 by a motor (not shown), the ADF 2 conveys the document P set on the document set portion 21, through the reading position 12 on the contact glass 11, to the sheet discharge portion 23.

The document presser 25 is located above the reading position 12 on the contact glass 11, via a gap through which the document P can pass. The document presser 25 has a shape elongated in the main scanning direction, and has a white sheet pasted on its lower surface (contact glass 1 side surface). It is noted that the sheet is used for acquiring white reference data as a white reference for image reading processing by the image reading portion 1.

Figure 3A:
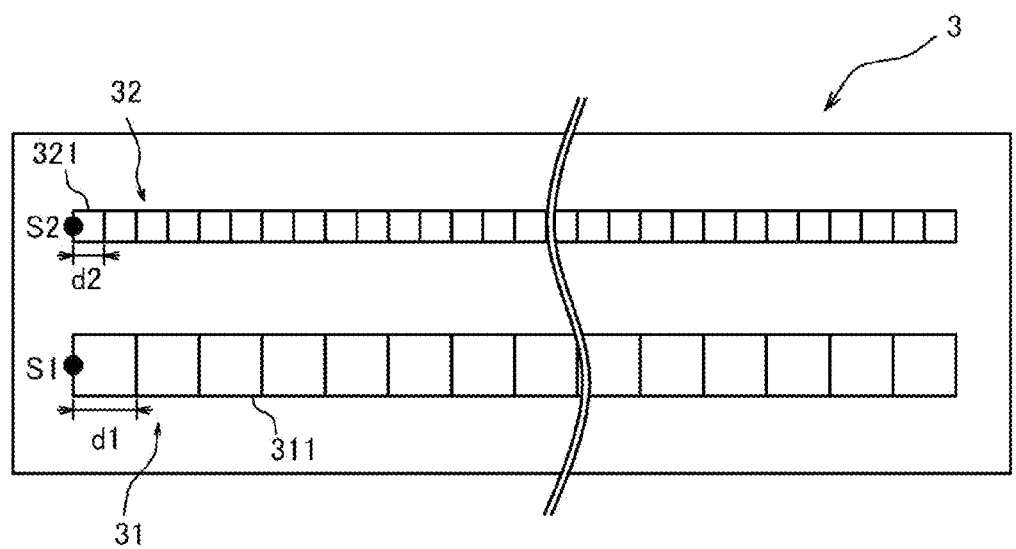
FIG. 3A and FIG. 3B are schematic diagrams showing an imaging unit according to the embodiment of the present disclosure.
Figure 3B:
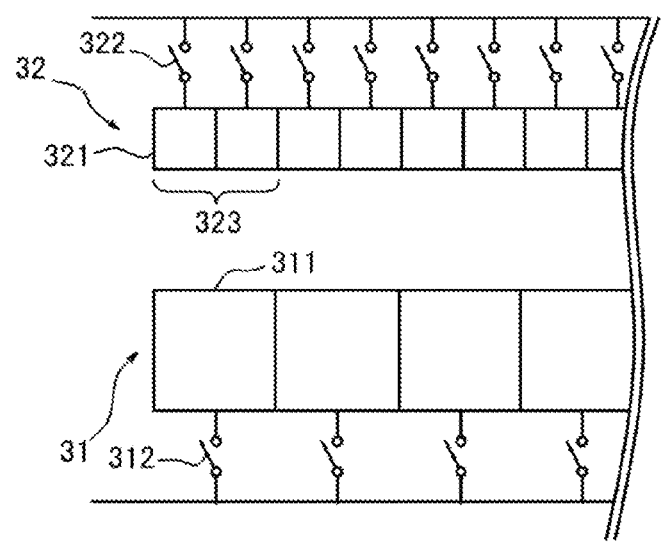

The imaging portion 16 includes an imaging unit 3 as shown in FIG. 3A and FIG. 3B. The imaging unit 3 is composed of a low resolution imaging portion 31 and a high resolution imaging portion 32 arranged in parallel via a predetermined distance in the sub scanning direction.

As shown in FIG. 3A, the low resolution imaging portion 31 is a linear image sensor having a plurality of light receiving elements 311 arranged with a first pitch d1 in the main scanning direction from a first reference position S1 at one end in the main scanning direction. Specifically, in the imaging portion 16, a CCD is used as the light receiving element 311. The low resolution imaging portion 31 is capable of outputting image data of the document P with a predetermined output resolution in a reading operation for the document P. Specifically, the low resolution imaging portion 31 is capable of outputting image data of the document P with the maximum output resolution of 600 dpi. Here, the low resolution imaging portion 31 is an example of a low resolution imaging portion.

As shown in FIG. 3B, in the low resolution imaging portion 31, switches 312 for switching electric conduction between ON and OFF are provided for the respective light receiving elements 311. The low resolution imaging portion 31 can sequentially turn on and off each switch 312 individually, thereby acquiring and outputting image data.

As shown in FIG. 3A, the high resolution imaging portion 32 is a linear image sensor having a plurality of light receiving elements 321 arranged with a second pitch d2 in the main scanning direction from a second reference position S2 which is separated from the first reference position S1 by a predetermined distance in the sub scanning direction. Specifically, in the imaging portion 16, a CCD is used as the light receiving element 321.

The high resolution imaging portion 32 is capable of outputting image data of the document P with a higher output resolution than the low resolution imaging portion 31, in a reading operation for the document P. Specifically, the maximum output resolution of the high resolution imaging portion 32 is n times (n is an integer) the maximum output resolution of the low resolution imaging portion 31. Therefore, the second pitch d2 which is the arrangement interval of the light receiving elements 321 is 1/n of the first pitch d1 for the light receiving elements 311, so that a relationship of $d2=d1/n$ is satisfied. In addition, a relationship of $b=n \times a$ is satisfied, where a is the number of the light receiving elements 311 and b is the number of the light receiving elements 321. Specifically, the high resolution imaging portion 32 is capable of outputting image data of the document P with the maximum output resolution of 1200 dpi, and the maximum resolution of the high resolution imaging portion 32 is two times the maximum output resolution of the low resolution imaging portion 31. In addition, the pitches d1 and d2 have a relationship of $d2=d1/2$, and the numbers a and b of the light receiving elements 311 and 321 have a relationship of $b=2a$.

As shown in FIG. 3B, in the high resolution imaging portion 32, switches 322 for switching electric conduction between ON and OFF are provided for the respective light receiving elements 321. Therefore, by sequentially turning on and off each switch 322 individually, image data can be acquired and outputted with the maximum output resolution (in the present embodiment, 1200 dpi). In addition, by turning on and off the switches 322 for each light receiving element group 323 composed of a plurality of the light receiving elements 321 that are adjacent to each other in the main scanning direction, the output resolution of the high resolution imaging portion 32 can be changed to low resolution. Specifically, each light receiving element group 323 is composed of two light receiving elements 321 that are adjacent to each other in the main scanning direction. By turning on and off the switches 322 for each light receiving element group 323, the output resolution of the high resolution imaging portion 32 can be halved (in the present embodiment, 600 dpi).

The control portion 4 has a CPU, a ROM, a RAM, an EEPROM (registered trademark), and the like. The CPU is a processor which executes various calculation processes. The ROM is a nonvolatile storage portion in which information such as a control program for causing the CPU to execute various processes is stored in advance. The RAM is a volatile storage portion in which various types of information are stored, and is used as a temporary storage memory (working area) for various processes executed by the CPU. The control portion 4 causes the CPU to execute processing in accordance with a predetermined control program stored in the ROM, thereby performing overall control for the image forming apparatus 10. It is noted that the control portion 4 may be formed by an electronic circuit such as an integrated circuit (ASIC, DSP).

As shown in FIG. 2, the control portion 4 includes a first reading portion 41, a second reading portion 42, a third reading portion 43, and a reading control portion 44. The control portion 4 causes the CPU to execute various processes in accordance with an image reading program stored in the ROM, thereby functioning as the first reading portion 41, the second reading portion 42, the third reading portion 43, and the reading control portion 44. The control portion 4, when functioning as the first reading portion 41, the second reading portion 42, the third reading portion 43, and the reading control portion 44, is examples of a first reading portion, a second reading portion, a third reading portion, and a reading control portion.

The first reading portion 41 acquires, as one-pixel output data, from the high resolution imaging portion 32, data acquired by n-number (n is an integer) of light receiving elements 321 that are adjacent to each other in the main scanning direction in the high resolution imaging portion 32. It is noted that such acquisition processing is an example of a first step. Specifically, in the present embodiment, the first reading portion 41 acquires, as one-pixel output data, data acquired by each light receiving element group 323 composed of two (n=2) light receiving elements 321 that are adjacent to each other in the main scanning direction, and generates image data. That is, the first reading portion 41 changes the output resolution of the high resolution imaging portion 32 to low resolution. In other words, the first reading portion 41 causes the high resolution imaging portion 32 having a high resolution to operate with a low resolution. In the present embodiment, when a reading operation is performed by the first reading portion 41, the output resolution of the high resolution imaging portion 32 having the maximum output resolution of 1200 dpi becomes a resolution of 600 dpi which is equal to that of the low resolution imaging portion 31.

The second reading portion 42 acquires output data from the high resolution imaging portion 32, with the start position for data acquisition in the high resolution imaging portion 32 displaced by a distance corresponding to m times (m is an integer) the second pitch d2 in the main scanning direction from the first reference position S1 which is the start position for data acquisition in the low resolution imaging portion 31. It is noted that such acquisition processing is an example of a second step. That is, without using, for the image data acquisition, m-number of light receiving elements 321 as counted from the second reference position S2 side, the second reading portion 42 acquires the image data using the (m+1)-th and subsequent light receiving elements 321 as counted from the second reference position S2 side. In the present embodiment, the second reading portion 42 acquires image data by the high resolution imaging portion 32, with the start position displaced by a distance corresponding to one time (m=1) the second pitch d2 in the main scanning direction from the second reference position S2 corresponding to the first reference position S1. That is, the second reading portion 42 does not acquire image data from the light receiving element 321 (the hatched light receiving element 321 in FIG. 5) that is closest to the second reference position S2 in the high resolution imaging portion 32.

The third reading portion 43 acquires, as one-pixel output data, data acquired by each light receiving element 321 of the high resolution imaging portion 32. Specifically, in the present embodiment, the third reading portion 43 reads the document P with a resolution of 1200 dpi which is the maximum output resolution, by the high resolution imaging portion 32.

The reading control portion 44 selects the first reading portion 41 or selects both of the first reading portion 41 and the second reading portion 42, and executes a reading operation for the document P by the low resolution imaging portion 31 and the high resolution imaging portion 32. It is noted that such processing is an example of a third step.

The data generating portion 5 generates image data of a document that is a reading target, using output data from the imaging unit 3 of the imaging portion 16. Particularly, the data generating portion 5 is capable of generating the image data of the document, using output data from the low resolution imaging portion 31 and the high resolution imaging portion 32. The data generating portion 5 includes an A/D converting portion 51, an image processing portion 52, an image memory portion 53, an image reading RAM 54, an image reading ROM 55, and an image reading CPU 56. Here, the data generating portion 5 is an example of a data generating portion.

Under control by the image reading CPU 56, the A/D converting portion 51 converts data (analog signal) inputted from the imaging unit 3 of the imaging portion 16 into a digital signal, and outputs the digital signal to the image processing portion 52.

Under control by the image reading CPU 56, the image processing portion 52 generates image data based on data inputted from the A/D converting portion 51.

The image memory portion 53 is a portion to which image data generated by the image processing portion 52 is inputted. Under control by the image reading CPU 56, the image memory portion 53 stores image data inputted from the image processing portion 52.

The image reading RAM 54 is a working memory used as a temporary storage space for data when the image reading CPU 56 executes a control program to perform various operations.

The image reading ROM 55 is a nonvolatile memory for storing a control program to be executed by the image reading CPU 56, and other data. The image reading ROM 55 stores a program and the like for generating image data by the image processing portion 52.

The image reading CPU 56 controls the overall operation of the image forming apparatus 10 based on the control program stored in the image reading ROM 55. It is noted that the image reading CPU 56 may include the function of the image processing portion 52.

The image forming portion 6 is an image forming portion of electrophotographic type which executes image forming processing (print processing) based on image data read by the image reading portion 1 or image data inputted from an information processing device such as an external personal computer. Specifically, the image forming portion 6 includes a conveyance portion 60, a photosensitive drum 61, a charging device 62, an exposure device (LSU) 63, a developing device 64, a transfer roller 65, a cleaning device 66, a fixing roller 67, a pressure roller 68, a sheet discharge tray 69, and the like.

The sheet feed portion 7 feeds a sheet such as paper contained in a sheet feed cassette 71 which is detachable from the image forming apparatus 10, to the image forming portion 6. The sheet fed to the image forming portion 6 is conveyed by the conveyance portion 60, to pass between the photosensitive drum 61 and the transfer roller 65 and then between the fixing roller 67 and the pressure roller 68, and then is discharged to the sheet discharge tray 69. At this time, in the image forming portion 6, an image forming process for forming an image on the sheet fed from the sheet feed portion 7 and conveyed by the conveyance portion 60 is executed by the following procedure.

First, the photosensitive drum 61 is uniformly charged to have a predetermined potential by the charging device 62. Next, light based on image data is radiated to the surface of the photosensitive drum 61 by the exposure device 63. Thus, an electrostatic latent image corresponding to the image data is formed on the surface of the photosensitive drum 61. Then, the electrostatic latent image on the photosensitive drum 61 is developed (visualized) with magnetic toner by the developing device 64. It is noted that the developing device 64 is supplied with magnetic toner from a toner container 64A which is detachable from the image forming portion 6. Subsequently, a toner image formed on the photosensitive drum 61 is transferred onto a sheet by the transfer roller 65. Thereafter, the transferred toner image on the sheet is heated by the fixing roller 67 when the sheet passes between the fixing roller 67 and the pressure roller 68, whereby the toner image is melted and fixed. It is noted that, after the image forming process by the image forming portion 6, the residual magnetic toner on the surface of the photosensitive drum 61 is removed by the cleaning device 66.

The operation display portion 8 is provided on the outer surface of the image forming apparatus 10. The operation display portion 8 has a display portion such as a liquid crystal display for displaying various types of information in accordance with a control instruction from the control portion 4. In addition, the operation display portion 8 has an operation portion such as a hardware key or a touch panel for inputting various types of information to the control portion 4 in accordance with a user's operation.

The communication I/F 9 is a communication interface for connecting the image forming apparatus 10 to a network such as the Internet or a LAN in a wired or wireless manner and executing data communication with an external device via the network.

[Examples of Reading Modes]

Hereinafter, examples of reading modes executable by the data generating portion 5 will be described. Under control by the reading control portion 44, the data generating portion 5 is capable of executing a scan process to read the document P and acquire image data in accordance with a mode selected from a plurality of reading modes. In the present embodiment, as the reading modes, four reading modes are provided, i.e., a streak elimination reading mode (first reading mode), a high-speed high-resolution reading mode (second reading mode), a high S/N reading mode (third reading mode), and a fine high-resolution reading mode (fourth reading mode).

The streak elimination reading mode (first reading mode) is a reading mode executable when the document P is read with use of the ADF 2. When the streak elimination reading mode is selected, a reading operation is performed by the first reading portion 41. That is, in the streak elimination reading mode, the high resolution imaging portion 32 outputs image data with a resolution (in the present embodiment, 600 dpi) equal to that of the low resolution imaging portion 31. Then, in the imaging portion 16, the document P is read by the low resolution imaging portion 31 and the high resolution imaging portion 32 of the imaging unit 3. Output data thus obtained from the low resolution imaging portion 31 and the high resolution imaging portion 32 are inputted to the data generating portion 5. The data generating portion 5 employs one having the higher brightness of output data from each light receiving element 311 and each light receiving element 321 located at the same position in the main scanning direction, to generate image data.

The high-speed high-resolution reading mode (second reading mode) is a reading mode executable when the document P is read with use of the ADF 2. When the high-speed high-resolution reading mode is selected, a reading operation is performed by both of the first reading portion 41 and the second reading portion 42. That is, in the high-speed high-resolution reading mode, since a reading operation is performed by the second reading portion 42, the start position for data acquisition in the high resolution imaging portion 32 is displaced by the second pitch d2 in the main scanning direction from the start position for data acquisition in the low resolution imaging portion 31. That is, in the high-speed high-resolution reading mode, the light receiving element 321 that is closest to the second reference position S2 in the high resolution imaging portion 32 is not used, and the second and subsequent light receiving elements 321 as counted from the second reference position S2 side are used for the data acquisition.

In addition, in the high-speed high-resolution reading mode, since the first reading portion 41 is selected to perform a reading operation, data obtained by two light receiving elements 321 that are adjacent to each other in the main scanning direction in the high resolution imaging portion 32 are acquired as one-pixel output data, whereby image data is generated. That is, in the high-speed high-resolution reading mode, the 2x-th and (2x+1)-th light receiving elements 321 (x is a natural number equal to or greater than 1) as counted from the second reference position S2 side are used as each light receiving element group 323 for outputting one-pixel output data. In other words, in the high-speed high-resolution reading mode, the high resolution imaging portion 32 has a resolution (in the present embodiment, 600 dpi) equal to that of the low resolution imaging portion 31, and functions as an imaging portion in which each light receiving element group 323 for obtaining one-pixel output data is located so as to be staggered, as seen from the sub scanning direction, relative to the respective light receiving elements 311 of the low resolution imaging portion 31.

In the high-speed high-resolution reading mode, the data generating portion 5 performs image processing of synthesizing image data in a rearranged manner based on output data from the high resolution imaging portion 32 and output data from the low resolution imaging portion 31. Thus, it becomes possible to acquire high-resolution output data of the document P at high speed.

The high S/N reading mode (third reading mode) is a reading mode executable when the document P placed at the reading position 22 on the contact glass 21 of the image reading portion 1 is scanned without using the ADF 2. When the document P is read in the high S/N reading mode, a reading operation is performed by the first reading portion 41. Thus, the imaging unit 3 of the imaging portion 16 is operated, and output data from the low resolution imaging portion 31 and the high resolution imaging portion 32 are inputted to the data generating portion 5. In the high S/N reading mode, the data generating portion 5 performs calculation processing for output data for the same position in the main scanning direction, that are outputted from each light receiving element 311 of the low resolution imaging portion 31 and each light receiving element 321 of the high resolution imaging portion 32. Thus, image data with a high S/N ratio is generated. For example, output data for the same position in the main scanning direction, that are outputted from each light receiving element 311 of the low resolution imaging portion 31 and each light receiving element 321 of the high resolution imaging portion 32, are integrated or averaged.

The fine high-resolution reading mode (fourth reading mode) is a reading mode executable when the document P placed at the reading position 22 on the contact glass 21 of the image reading portion 1 is scanned without using the ADF 2. When the document P is read in the fine high-resolution reading mode, a reading operation is performed by the third reading portion 43. In addition, in the fine high-resolution reading mode, the data generating portion 5 generates image data by using only output data obtained from the light receiving elements 321 of the high resolution imaging portion 32.

For general image forming apparatuses, it is difficult to provide individually one of different effects relevant to image quality improvement in image data, such as prevention of occurrence of streak-like noise, realization of high S/N ratio, or improvement in resolution. For example, general image reading devices cannot freely select the type of image quality improvement in image data. On the other hand, the image forming apparatus 10 can freely select the type of image quality improvement in image data obtained by the image reading process.

[Example of Scan Process]

Figure 7:
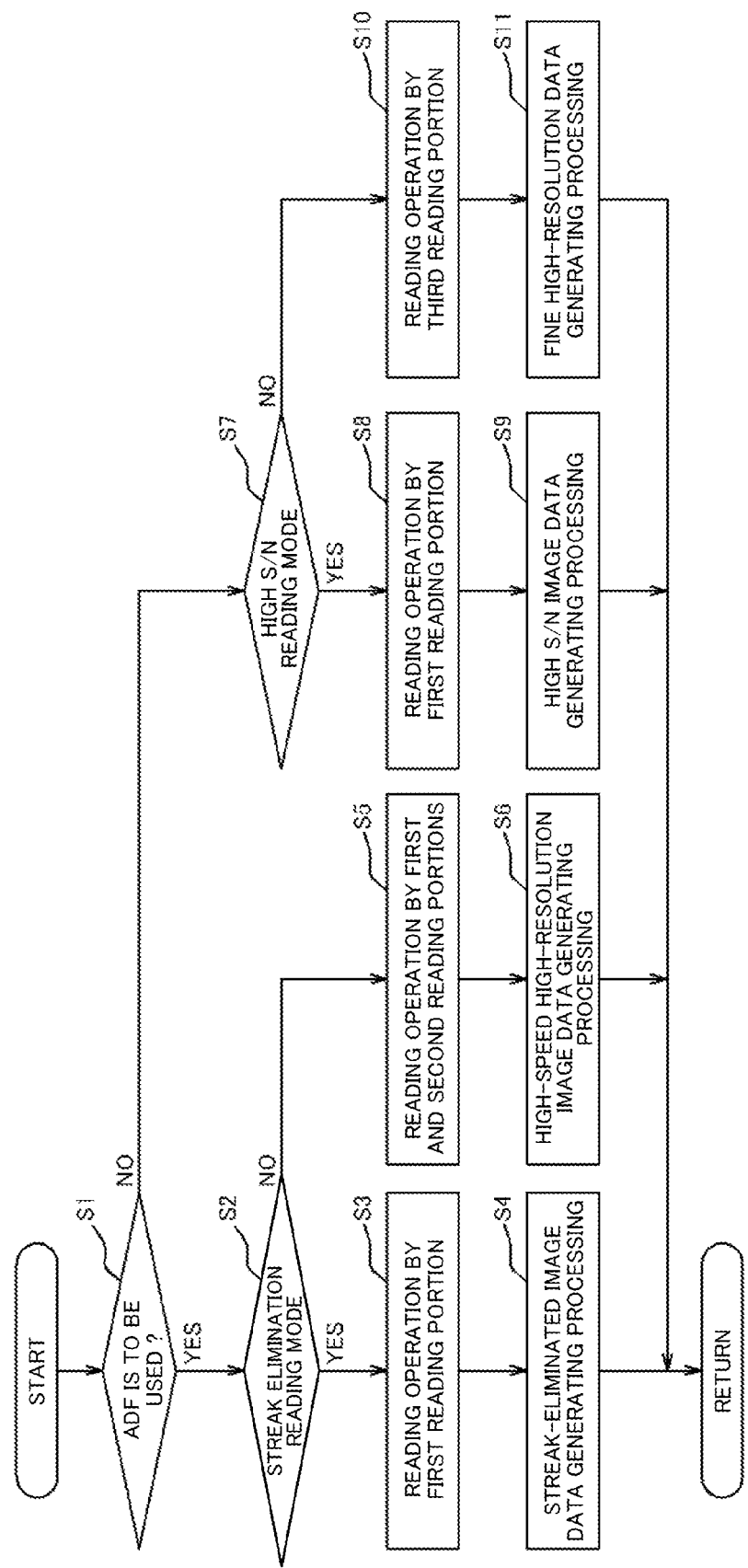
FIG. 7 is a flowchart showing an example of a procedure of a scan process executed by an image processing device according to the embodiment of the present disclosure.

Hereinafter, with reference to a flowchart in FIG. 7, an example of the procedure of the scan process executed by the control portion 4 in the image forming apparatus 10 will be described. It is noted that the present disclosure may be understood as a disclosure of an image reading method including a part or the entirety of the scan process executed in the image forming apparatus 10.

<Step S1>

In step S1, the control portion 4 determines whether or not the scan process for the document P by the image forming apparatus 10 is to be performed with use of the ADF 2. Here, if it is determined that the ADF 2 is used (YES in S1), the process proceeds to step S2. On the other hand, if it is determined that the ADF 2 is not used and the scan process is to be performed for the document P placed on the contact glass 11 (NO in S1), the process proceeds to step S7.

<Step S2>

In step S2, the control portion 4 determines whether or not the streak elimination reading mode is selected as the reading mode. Here, if it is determined that the streak elimination reading mode is selected (YES in S2), the process proceeds to step S3. On the other hand, if it is determined that the streak elimination reading mode is not selected, that is, if it is determined that the high-speed high-resolution reading mode is selected (NO in S2), the process proceeds to step S5.

<Step S3>

Figure 4:
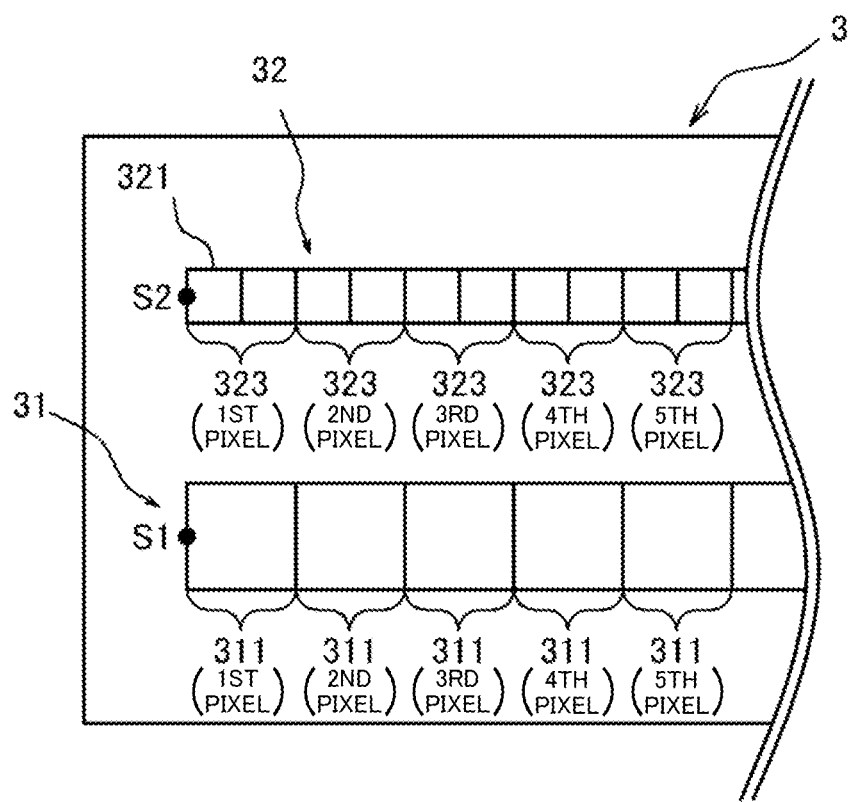
FIG. 4 is a schematic diagram showing the case where the imaging unit performs a reading operation by a first reading portion, according to the embodiment of the present disclosure.

In step S3, the reading control portion 44 of the control portion 4 causes the imaging portion 16 to execute the reading operation by the first reading portion 41 (see FIG. 4). That is, in step S3, the reading operation is performed so that the high resolution imaging portion 32 outputs image data with a resolution (in the present embodiment, 600 dpi) equal to that of the low resolution imaging portion 31. Output data from the low resolution imaging portion 31 and the high resolution imaging portion 32 are inputted to the data generating portion 5.

<Step S4>

In step S4, the data generating portion 5 of the control portion 4 executes streak-eliminated image data generating processing. That is, the data generating portion 5 employs, as output data for image data generation, one having the higher brightness of the output data from each light receiving element 311 and each light receiving element 321 located at the same position in the main scanning direction. The data generating portion 5 combines the output data employed as described above, thereby generating image data. Such image processing can suppress occurrence of streak-like noise on the image data due to a foreign material or the like on the ADF 2.

<Step S5>

Figure 5:
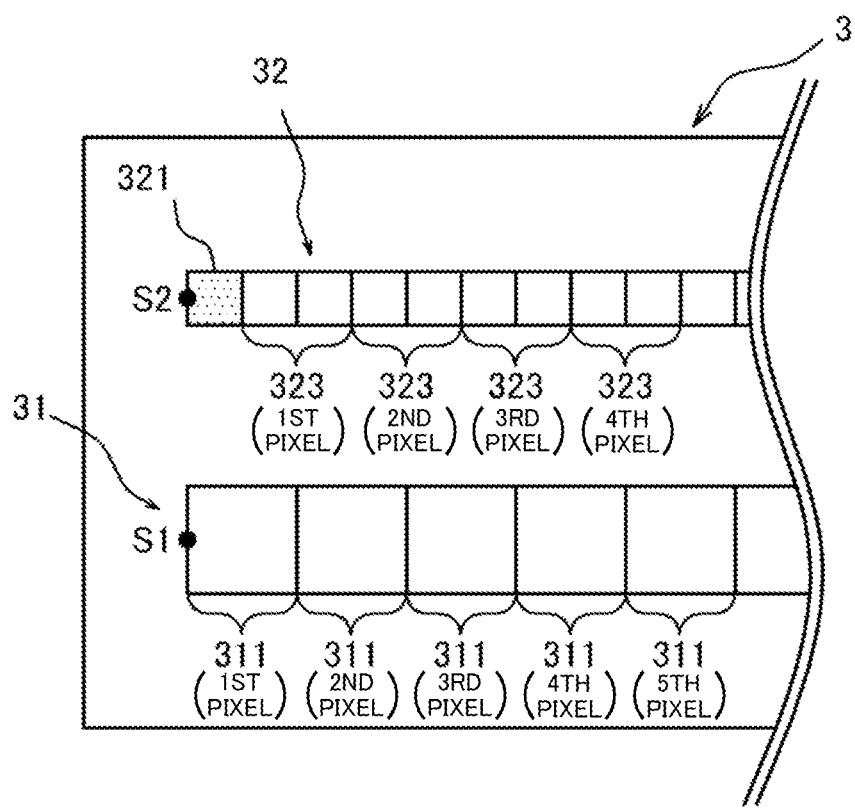
FIG. 5 is a schematic diagram showing the case where the imaging unit performs a reading operation by a second reading portion, according to the embodiment of the present disclosure.

In step S5, the reading control portion 44 of the control portion 4 causes the imaging portion 16 to execute the reading operation by both of the first reading portion 41 and the second reading portion 42 (see FIG. 5). That is, in step S5, the high resolution imaging portion 32 is allowed to make output with a resolution (in the present embodiment, 600 dpi) equal to that of the low resolution imaging portion 31. In addition, each light receiving element group 323 for obtaining one-pixel output data in the high resolution imaging portion 32 is set so as to be staggered, as seen from the sub scanning direction, relative to the respective light receiving elements 311 of the low resolution imaging portion 31. The reading operation is performed in such a state, and output data from the low resolution imaging portion 31 and the high resolution imaging portion 32 are inputted to the data generating portion 5.

<Step S6>

In step S6, the data generating portion 5 executes high-speed high-resolution image data generating processing. That is, the data generating portion 5 performs image processing of synthesizing image data in a rearranged manner based on the output data from the high resolution imaging portion 32 and the output data from the low resolution imaging portion 31. By such image processing, output data of the document P with a high resolution can be obtained at high speed.

<Step S7>

In step S7, the control portion 4 determines whether or not the high S/N reading mode is selected as the reading mode. Here, if it is determined that the high S/N reading mode is selected (YES in S7), the process proceeds to step S8. On the other hand, if it is determined that the high S/N reading mode is not selected, that is, if it is determined that the fine high-resolution reading mode is selected (NO in S7), the process proceeds to step S10.

<Step S8>

In step S8, the reading control portion 44 of the control portion 4 causes the imaging portion 16 to execute the reading operation by the first reading portion 41 (see FIG. 4). That is, in step S8, the reading operation is performed so that the high resolution imaging portion 32 outputs image data with a resolution (in the present embodiment, 600 dpi) equal to that of the low resolution imaging portion 31. Output data from the low resolution imaging portion 31 and the high resolution imaging portion 32 are inputted to the data generating portion 5.

<Step S9>

In step S9, the data generating portion 5 executes high S/N image data generating processing. That is, the data generating portion 5 executes calculation processing for output data for the same position in the main scanning direction, that are outputted from each light receiving element 311 of the low resolution imaging portion 31 and each light receiving element 321 of the high resolution imaging portion 32. Data obtained by this calculation processing are arranged in the main scanning direction, whereby image data with a high S/N ratio is generated.

<Step S10>

Figure 6:
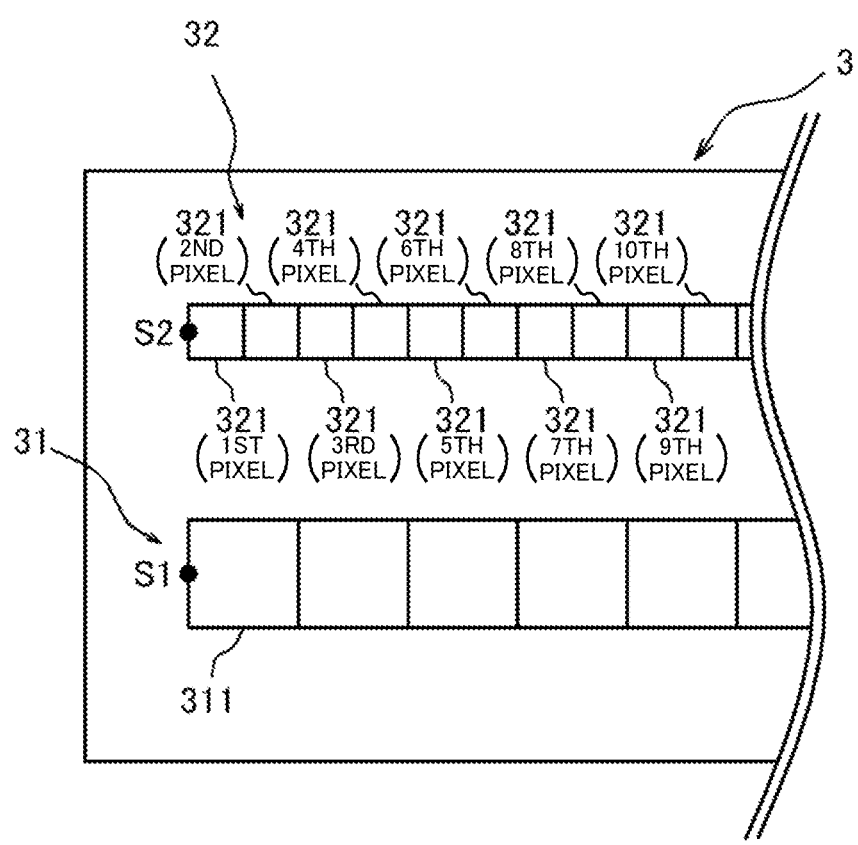
FIG. 6 is a schematic diagram showing the case where the imaging unit performs a reading operation by a third reading portion, according to the embodiment of the present disclosure.

In step S10, the reading control portion 44 of the control portion 4 causes the imaging portion 16 to execute the reading operation by the third reading portion 43 (see FIG. 6). That is, the reading control portion 44 executes scan of the document P on the contact glass 21 by using the high resolution imaging portion 32. Thus, output data with a resolution of 1200 dpi which is the maximum output resolution of the high resolution imaging portion 32 is obtained, and then inputted to the data generating portion 5. It is noted that in step S10, reading of the document P by the low resolution imaging portion 31 is not executed. In another embodiment, in step S10, reading of the document P by the low resolution imaging portion 31 may be executed.

<Step S11>

In step S11, the data generating portion 5 executes fine high-resolution data generating processing. That is, the data generating portion 5 generates image data of the document P based on the output data obtained from the high resolution imaging portion 32 in step S10.

As described above, the image forming apparatus 10 according to the present embodiment can freely select the type of image quality improvement in image data read from the document P.

Another Embodiment 1

Figure 8:
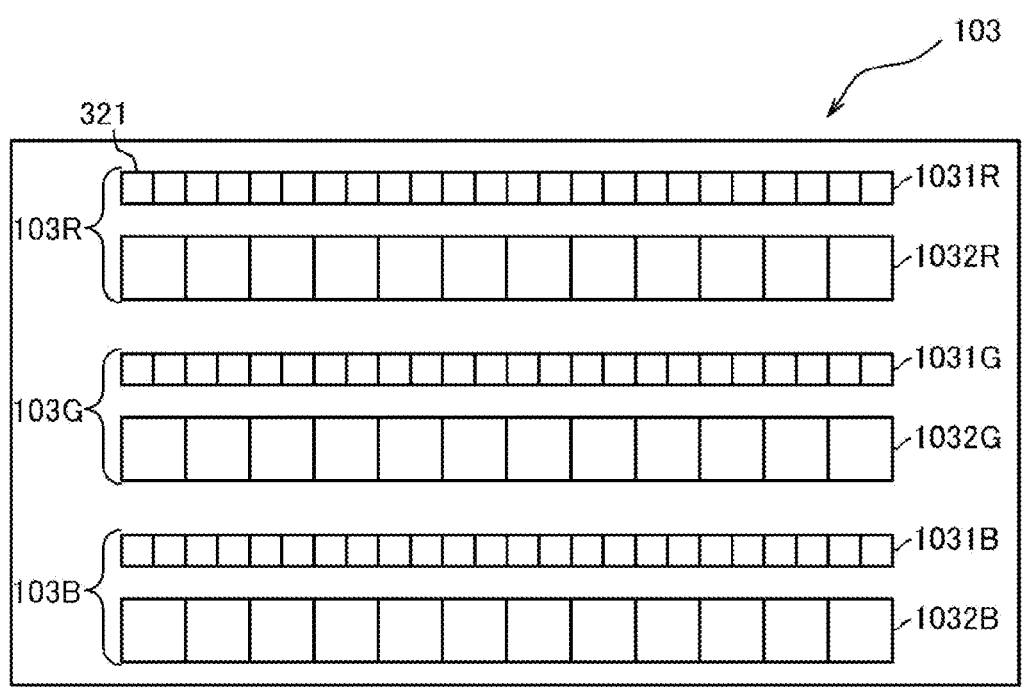
FIG. 8 is a schematic diagram showing an imaging unit according to another embodiment 1 of the present disclosure.

Hereinafter, with reference to FIG. 8, another embodiment 1 of the image forming apparatus 10 will be described. In the following description, the same configuration as in the above embodiment will not be described.

Specifically, the image processing device 10 according to the other embodiment 1 has a difference that an imaging unit 103 is used instead of the imaging unit 3. Unlike the imaging unit 3 for monochrome image scan, the imaging unit 103 is for color image scan.

In more detail, the imaging unit 103 includes three imaging units of an imaging unit 103R for red, an imaging unit 103G for green, and imaging unit 103B for blue. The imaging unit 103R for red, the imaging unit 103G for green, and the imaging unit 103B for blue each include a combination of a low resolution imaging portion and a high resolution imaging portion, as in the imaging unit 3. Specifically, the imaging unit 103R for red is composed of a low resolution imaging portion 1031R for red and a high resolution imaging portion 1032R for red arranged in parallel. Similarly, the imaging unit 103G for green is composed of a low resolution imaging portion 1031G for green and a high resolution imaging portion 1032G for green arranged in parallel, and the imaging unit 103B for blue is composed of a low resolution imaging portion 1031B for blue and a high resolution imaging portion 1032B for blue arranged in parallel. The low resolution imaging portion 1031R for red, the low resolution imaging portion 1031G for green, and the low resolution imaging portion 1031B for blue have the same configuration as the low resolution imaging portion 31, so the detailed description thereof is omitted. Also, the high resolution imaging portion 1032R for red, the high resolution imaging portion 1032G for green, and the high resolution imaging portion 1032B for blue have the same configuration as the high resolution imaging portion 32, so the detailed description thereof is omitted.

Also in the imaging unit 103, as in the case of using the imaging unit 3 described above, the document P can be scanned by the first reading portion 41, the second reading portion 42, and the third reading portion 43, using the imaging unit 103R for red, the imaging unit 103G for green, and the imaging unit 103B for blue. In addition, as in the case of using the imaging unit 3 described above, the scan process can be performed in a mode selected from the plurality of reading modes by switching the reading setting for each of the imaging unit 103R for red, the imaging unit 103G for green, and the imaging unit 103B for blue. Also in the case of using the imaging unit 103, the scan process can be performed for each of the imaging unit 103R for red, the imaging unit 103G for green, and the imaging unit 103B for blue, by the same method as in the case of using the imaging unit 3, so the detailed description thereof is omitted.

In addition, in the imaging unit 103, the low resolution imaging portion 1031R for red and the high resolution imaging portion 1032R for red of the imaging unit 103R for red are located closely to each other. Therefore, the capacitance of a buffer needed for synthesizing image data for the same line obtained from the low resolution imaging portion 1031R for red and the high resolution imaging portion 1032R for red can be reduced. This also applies to the imaging unit 103G for green and the imaging unit 103B for blue.

Another Embodiment 2

Figure 9:
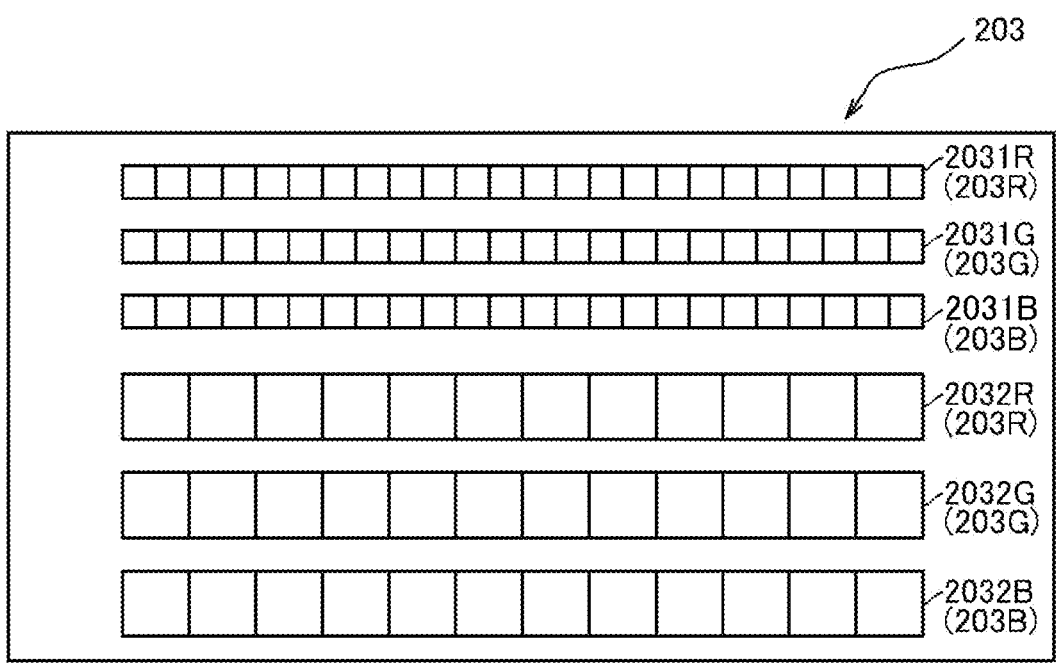
FIG. 9 is a schematic diagram showing an imaging unit according to another embodiment 2 of the present disclosure.

Hereinafter, with reference to FIG. 9, another embodiment 2 of the image forming apparatus 10 will be described. In the following description, the same configuration as in the above embodiment will not be described. The image forming apparatus 10 according to the other embodiment 2 includes an imaging unit 203 instead of the imaging unit 3 described in the above embodiment.

Specifically, the imaging unit 203 includes three imaging units of an imaging unit 203R for red, an imaging unit 203G for green, and an imaging unit 203B for blue, as in the imaging unit 103 described in the other embodiment 1. The imaging unit 203R for red has a low resolution imaging portion 2031R for red and a high resolution imaging portion 2032R for red. In addition, the imaging unit 203G for green has a low resolution imaging portion 2031G for green and a high resolution imaging portion 2032G for green. Further, the imaging unit 203B for blue has a low resolution imaging portion 2031B for blue and a high resolution imaging portion 2032B for blue.

On the other hand, placement of the low resolution imaging portion and the high resolution imaging portion in the imaging unit 203 is different from that in the imaging unit 103. Specifically, in the imaging unit 203, the low resolution imaging portion 2031R for red, the low resolution imaging portion 2031G for green, and the low resolution imaging portion 2031B for blue are arranged in parallel. In addition, the high resolution imaging portion 2032R for red, the high resolution imaging portion 2032G for green, and the high resolution imaging portion 2032B for blue are arranged in parallel. That is, in the imaging unit 203, the low resolution imaging portion and the high resolution imaging portion of each of the imaging unit 203R for red, the imaging unit 203G for green, and the imaging unit 203B for blue are separately placed. Thus, a low resolution imaging portion group is formed in which the low resolution imaging portion 2031R for red, the low resolution imaging portion 2031G for green, and the low resolution imaging portion 2031B for blue are arranged in parallel, and at a position adjacent thereto, a high resolution imaging portion group is formed in which the high resolution imaging portion 2032R for red, the high resolution imaging portion 2032G for green, and the high resolution imaging portion 2032B for blue are arranged in parallel.

Also in the imaging unit 203, as in the case of using the imaging unit 3 described above, the document P can be scanned by the first reading portion 41, the second reading portion 42, and the third reading portion 43, using the imaging unit 203R for red, the imaging unit 203G for green, and the imaging unit 203B for blue. In addition, as in the case of using the imaging unit 3 described above, the scan process can be performed in a mode selected from the plurality of reading modes by switching the reading setting for each of the imaging unit 203R for red, the imaging unit 203G for green, and the imaging unit 203B for blue. Also in the case of using the imaging unit 203, the scan process can be performed for each of the imaging unit 203R for red, the imaging unit 203G for green, and the imaging unit 203B for blue, by the same method as in the case of using the imaging unit 3, so the detailed description thereof is omitted.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image reading device comprising:
a low resolution imaging portion including a plurality of light receiving elements arranged with a first pitch in a main scanning direction from a first reference position;
a high resolution imaging portion including a plurality of light receiving elements arranged with a second pitch in the main scanning direction from a second reference position which is separated from the first reference position by a predetermined distance in a sub scanning direction, a resolution of the high resolution imaging portion being n times that of the low resolution imaging portion, where n is an integer;
a data generating portion configured to generate image data of a document that is a reading target, using output data from the high resolution imaging portion and the low resolution imaging portion;
a first reading portion configured to acquire, from the high resolution imaging portion, as the output data for one pixel, data acquired by n-number of the light receiving elements that are adjacent to each other in the main scanning direction in the high resolution imaging portion;
a second reading portion configured to acquire the output data from the light receiving elements arranged in the main scanning direction from a start position which is a position displaced by a distance corresponding to m times the second pitch in the main scanning direction from the first reference position in the high resolution imaging portion, where m is an integer; and
a reading control portion configured to execute a reading operation for a document by the low resolution imaging portion and the high resolution imaging portion, selecting the first reading portion or selecting both of the first reading portion and the second reading portion.

2. The image reading device according to claim 1, wherein the data generating portion is capable of performing the reading operation in a first reading mode in which the data generating portion,
acquires output data outputted by the reading operation by the first reading portion, from the high resolution imaging portion, and acquires output data from the low resolution imaging portion, and
generates the image data, using one having a higher brightness of the output data for the same position in the main scanning direction, that are outputted from each light receiving element of the high resolution imaging portion and each light receiving element of the low resolution imaging portion.

3. The image reading device according to claim 1, wherein the data generating portion is capable of performing the reading operation in a second reading mode in which the data generating portion,
acquires output data outputted by the reading operation with both of the first reading portion and the second reading portion being selected, from the high resolution imaging portion, and acquires output data from the low resolution imaging portion, and
synthesizes the image data in a rearranged manner based on the output data from the high resolution imaging portion and the output data from the low resolution imaging portion.

4. The image reading device according to claim 1, wherein the data generating portion is capable of performing the reading operation in a third reading mode in which the data generating portion,
acquires output data outputted by the reading operation by the first reading portion, from the high resolution imaging portion, and acquires output data from the low resolution imaging portion, and
generates the image data by performing calculation processing for the output data for the same position in the main scanning direction, that are outputted from each light receiving element of the high resolution imaging portion and each light receiving element of the low resolution imaging portion.

5. The image reading device according to claim 1, further comprising a third reading portion configured to acquire, from the high resolution imaging portion, as the output data for one pixel, data acquired by each light receiving element of the high resolution imaging portion,
wherein the data generating portion is capable of performing the reading operation in a fourth reading mode in which the data generating portion generates the image data, using only the output data acquired by the third reading portion.

6. An image forming apparatus comprising:
the image reading device according to claim 1; and
an image forming portion configured to form an image based on image data read by the image reading device.

7. An image reading method executed in an image reading device including: a low resolution imaging portion including a plurality of light receiving elements arranged with a first pitch in a main scanning direction from a first reference position; a high resolution imaging portion including a plurality of light receiving elements arranged with a second pitch in the main scanning direction from a second reference position which is separated from the first reference position by a predetermined distance in a sub scanning direction, a resolution of the high resolution imaging portion being n times that of the low resolution imaging portion, where n is an integer; and a data generating portion configured to generate image data of a document that is a reading target, using output data from the high resolution imaging portion and the low resolution imaging portion, the image reading method comprising:
- a first step of acquiring, from the high resolution imaging portion, as the output data for one pixel, data acquired by n-number of the light receiving elements that are adjacent to each other in the main scanning direction in the high resolution imaging portion;
- a second step of acquiring the output data from the light receiving elements arranged in the main scanning direction from a start position which is a position displaced by a distance corresponding to m times the second pitch in the main scanning direction from the first reference position in the high resolution imaging portion, where m is an integer; and
- a third step of executing a reading operation for a document by the low resolution imaging portion and the high resolution imaging portion, selecting the first step or selecting both of the first step and the second step.

* * * * *